United States Patent [19]
Knox

[11] 4,228,390
[45] Oct. 14, 1980

[54] BATTERY CHARGER
[75] Inventor: Raymond L. Knox, Bluefield, W. Va.
[73] Assignee: A-T-O Inc., Willoughby, Ohio
[21] Appl. No.: 892,302
[22] Filed: Mar. 31, 1978
[51] Int. Cl.$^2$ ............................................. H02J 7/04
[52] U.S. Cl. ........................................ 320/38; 320/55
[58] Field of Search ..................... 361/6, 76, 85, 86; 307/13; 320/37, 38, 39, 40, 21, 11, 54, 55

[56] References Cited
U.S. PATENT DOCUMENTS

| | | | |
|---|---|---|---|
| 2,372,698 | 4/1945 | Whitesell | 320/38 X |
| 3,576,487 | 4/1971 | Chase | 320/39 |
| 3,633,072 | 1/1972 | Duncan | 361/85 X |

Primary Examiner—Robert J. Hickey
Attorney, Agent, or Firm—Webster B. Harpman

[57] ABSTRACT

A control circuit for a three phase battery charging system which is enabled only when a battery is properly connected, when the source is properly connected and when the system has been properly turned on. Any disruption in these connections or failure of the source interrupts the charging cycle until the failure has been corrected.

8 Claims, 1 Drawing Figure

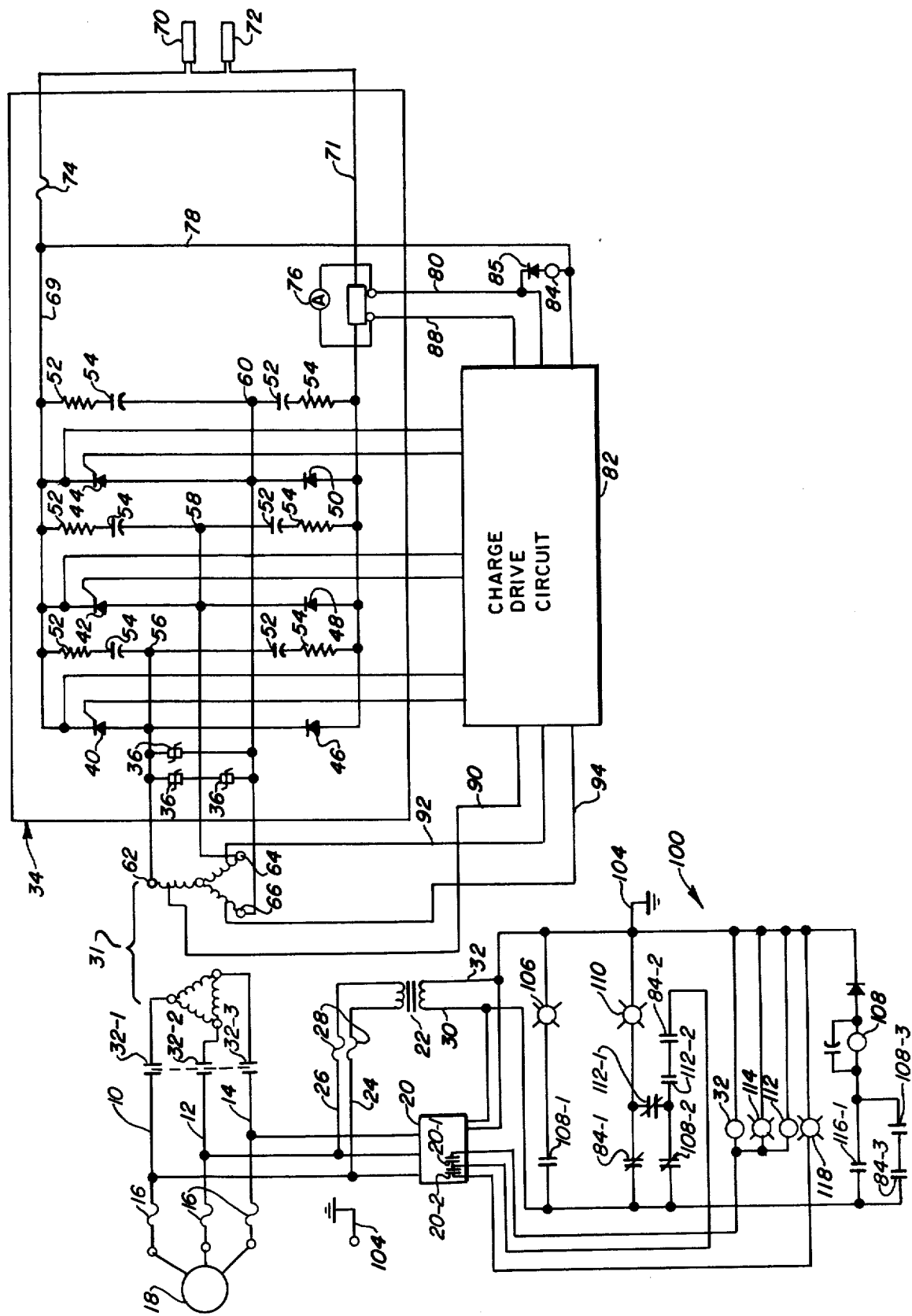

BATTERY CHARGER

BACKGROUND OF THE INVENTION

There is in existence, a variety of battery powered equipment and industrial machinery which utilize commercial storage batteries. Such equipment is often utilized in areas where other sources of power are not available or not suitable. For example, in many mines it may not be appropriate to use internal combustion engines because the engine exhausts render the area in which miners are working unsafe. At the same time, the availability of electric power lines is limited and in any event the connection to power lines could limit the mobility of electric powered equipment.

However, if in those instances where battery powered equipment is utilized, it is, of course, necessary to provide some capability for recharging the batteries. It should be understood, that the personnel available for this purpose are not skilled mechanics or service personnel, and in many instances battery charging must be accomplished in remote areas by untrained people.

It would be highly desirable, therefore, to provide a battery charging system which is easy to use, fully automatic, and which would require no field adjustments. At the same time, such a system should provide a complete battery charge regardless of initial battery conditions, charging line voltage and ambient temperature, and should insure proper operation without the necessity for trained personnel to set up the system or to make necessary adjustments and connections.

SUMMARY OF THE INVENTION

In accordance with the present invention, there is provided a battery charging system for storage batteries which includes control circuitry to insure fail safe operation, to protect against phase reversal, phase loss and supply voltage exceeding limits, and to provide necessary indication of the status of the charge. Such a system automatically disables the charger in the event of improper connections either to the power source or to the batteries being charged, and automatically provides the necessary charging times to achieve complete charging of the batteries to which it is connected.

The control circuitry for such battery charging system is powered by the battery being charged rather than by the charging voltage so that temporary loss of the charging voltage will result only in the interruption of operation rather than resetting of the system. In addition, the system will not operate if the batteries are incorrectly connected or if no batteries are connected. Operation of the system is inhibited if the three phase source for the charging signal is connected incorrectly, if any one phase drops out, or if voltage variation in the source voltage exceeds or decreases below selected limits.

A plurality of indicators provides the necessary information about the status of the system for relatively easy and simple monitoring and for communicating when the batteries have been charged.

More specifically, the system of the present invention is designed for charging dc storage batteries utilizing a three phase ac power line as the charging voltage source. The control circuit for the charger includes a phase sensitive relay unit connected to the source which is enabled only when the phase source is properly connected to the charged input lines and when the voltages on each phase are within selected limits of their nominal value. When enabled, a control signal applied to the phase relay energizes the relay contacts to enable the control circuit and charger.

The circuit is operated only when a battery to be charged is properly connected to the charging output terminals of the charging system to complete the circuit through a three phase transformer to the charging circuit. If no batteries are connected to the output terminals or if the batteries are connected improperly, the system provides an appropriate indication and the control circuit precludes reverse charging of the batteries.

The charger drive circuitry which does not form part of the present invention can be any circuitry which is responsive to each phase of the charging voltage to connect each phase to the battery and provide the necessary charging current as a function of the battery voltage.

If for any other reason, for example, incorrect phase connection or variation in the charging signal beyond limits, the phase relay is disabled until such time as conditions are returned to normal, an appropriate indicator is energized. At the same time, the charging circuit is not totally reset so that when conditions return to normal the control circuit merely reactivates the charging circuit which picks up the charging cycle at the point where it was previously disabled. The system appropriately indicates when charging is complete and automatically terminates the charging cycle.

Numerous other advantages and features of the present invention will become readily apparent from the following detailed description of the invention and of one embodiment thereof, from the claims and from the accompanying drawing in which each and every detail shown is fully and completely disclosed as a part of this specification in which like numerals refer to like parts.

BRIEF DESCRIPTION OF THE DRAWING

The single FIGURE is a diagram showing a battery charging system incorporating the control circuit of the present invention.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring to the drawing, there is shown a schematic diagram of a battery charging system and control circuit embodying the present invention. The system includes three input lines 10, 12, 14, each having a fuse 16, for connection to a three phase source 18. Each of the input lines 10, 12, 14 is connected to a separate terminal of a phase sensitive control relay 20. One suitable relay is a model No. E361, manufactured by Hartman Electrical Co., of Mansfield, Ohio.

Such a relay is enabled when a three phase power source is connected in proper phase sequence to the three input lines 10, 12, 14, and when the voltage on each phase of the input lines is within a set limit, e.g., plus or minus 15% of the nominal operating range. The relay is enabled when all input conditions are within limits for a time greater than two seconds. The relay is disabled if for a period of 50 milliseconds the voltage on all three phases exceeds or drops below limits, if the voltage on any one phase drops below twice the normal limits, if the input source is not connected to the input line in correct sequence or if, as described below, there is a loss of the control signal.

Two of the input lines 10, 12 are connected to the primary of a single phase control transformer 22, through input control lines 24, 26 in which are located control fuses 28. The secondary of the control transformer 22 provides a single phase control signal connected through lines 30, 32 applied to the control terminals of the phase sensitive relay 20. The relay 20, when enabled as described above, is energized in response to the application of the control signal to the control terminals and is deenergized, even if enabled, in the absence of a control signal.

The three input lines 10, 12, 14 are also connected to the primary of a three phase transformer 31 through three main contactors 32-1, 32-2, 32-3, one in each of the input lines 10, 12, 14. The wye secondary of the transformer 31 is connected to a SCR charging circuit 34. A plurality of surge suppressors 36 are connected across the secondary of transformer 31.

The charging circuit 34 consists of a three phase bridge rectifier. The bridge rectifier includes three switchable circuit elements, shown as SCR's 40, 42, 44, each connected in series with a diode 46, 48, 50, respectively. A plurality of series connected resistors 52 and capacitors 54 are connected across each of the SCR's 40, 42, 44 and each of the diodes 46, 48, 50. Each junction 56, 58, 60, respectively, between the cathode of each diode 46, 48, 50 and the anode of each corresponding SCR 40, 42, 44 is connected to the free end 62, 64, 66, respectively, of the wye secondary of transformer 30.

A positive output line 69 connects a positive output charging terminal 70 to the cathodes of the SCR's 40, 42, 44, and a negative output line 71 connects negative output charging terminal 72 to the anodes of the diodes 46, 48, 50. The batteries to be charged are connected to the output terminals 70, 72. A fuse 74 is located in the positive output line 69, and an ammeter 76 is connected in the negative output line 71.

A pair of sensing lines 78, 80 are connected between the output charging terminals 70, 72 and a charge drive circuit 82 to monitor the terminal voltage of the batteries connected to the output charging terminals 72. A relay coil 84 in series with a polarity diode 85 are connected across sensing lines 78, 80. The load sensing relay 84 is energized if and only if a battery is connected to the output charging terminals 70, 72, and then, because of diode 85, only if connected in proper polarity, i.e., positive battery terminal to positive charging terminal 70 and negative battery terminal to negative charging terminal 72. The contacts of the load sensing relay 84 form part of the control system described in more detail below. The charging current is monitored by the drive circuit 82 which is connected across the ammeter 76 by sensing lines 80, 88.

The drive circuit 82 is responsive to the battery terminal voltage and to the charging current for selectively applying trigger pulses to the bridge rectifier circuit to produce the desired charging of the batteries. One suitable drive circuit is manufactured by Power Control Corporation, of Pittsburgh, Penn. and identified as their model No. 426A009. The drive circuit 82 utilizes three control signals which are derived over lines 90, 92, 94 from the secondary of the transformer 30 to trigger the SCR's in appropriate sequence.

In operation, when the terminal voltage of the batteries to be charged are less than a selected value, typically about 2.4 volts per cell, the drive circuit 82 operates the charger to charge the batteries at a constant current equal to twenty percent of a known preset amp-hour rating of the batteries to be charged. When the terminal voltage reaches the selected value, the drive circuit 82 switches to a voltage regulated mode to hold the charging voltage constant until the current falls to a value equal to five percent of the amp-hour rating of the batteries. When this value of current is achieved, a built in timer within the drive circuit maintains that positive current for a fixed period of time, typically three hours, at which time the timer energizes a shut down trigger relay to terminate the charging signal.

Turning to the control circuit 100, the line 32, connected to one side of the secondary of the control transformer 22 is connected to ground 104 and one side of said control circuit 100. The other line 30 connected to the secondary of transformer 22 is connected to the other side of the control circuit 100.

The control circuit 100 includes a complete charge indicator 106 in series with the normally open contacts 108-1 of the shut down relay 108, and an incomplete charge indicator 110 in series with the normally closed contacts 84-1 of the load sensing relay 84. In addition, the normally closed contacts 112-1 of an override timer 112 in series with the normally closed contacts 108-2 of the shut down relay 108 are connected across load sensing contacts 84-1.

The control circuit 100 also includes a main contactor coil 32 connected in series with the normally closed contacts 108-2 of the shut down relay 108, the normally open contacts 112-2 of the override timer 112, the normally open contacts 84-2 of the load sensing relay 84 and the normally open contacts 20-1 of the phase sensitive relay 20. A charging indicator 114 and the override timer 112 are connected in parallel with the contactor coil 32.

The override timer 112, which is utilized to activate the system and is manually set to a selected time interval, operates only when a control signal is applied thereto. The shut down relay 108 is connected in series with normally open contacts 116-1 of a shut down trigger relay in charge drive circuit 62. Normally open contacts 84-3 of the load sensing relay 84 and normally open contacts 108-3 of shut down relay 101 are connected across contacts 116-1.

In operation, the phase sensitive relay 20 is enabled when the three phase source is connected to the input lines 10, 12, 14 in the proper sequence and when the voltage on each phase is within tolerances. When this occurs, and when a control signal is produced and applied to the phase sensitive relay 20, the normally open contacts 70-1 in series with the contactor coil 32 and override timer 112 close, and the normally closed contacts 20-2 in series with a phase reversal indicator 118 open, thus turning that indicator off.

If a battery has been properly connected to the output charging terninals 70, 72, load sensing relay 84 will be energized opening the normally closed contacts 84-1 in series indicator 110 and closing contacts 84-2 in series with the contactor coil 32 and override timer 112. Until the override timer 112 is manually set, however, the incomplete indicator 110 remans on due to the normally closed contacts 108-2 of the shut down relay 108 and the normally closed contacts 112-1 of the override timer 112.

When the override timer 112 is set, the normally closed contacts 112-1 open to deenergize the incomplete indicator 110, and normally contacts 112-2 are closed to complete the circuit through the main contactor coil 32 and the override timer 112 itself. As a result, the main contactors 32-1, 32-2, 32-3 in the input lines 10, 12, 14 close applying energy to the three phase transformer 30 to initiate the charging cycle.

If at any time, there is a loss of power on any one of the input lines 10, 12, 14 or of all the phases from the source, the phase relay 20 is disabled. The phase relay contacts 20-1 open and contacts 20-2 close, thereby disconnecting the secondary of control transformer 22, i.e., the control signal, from the main contactor coil 32 and timer 112. As a result, the main contactors 32-1, 32-2, 32-3 open to deenergize the charging circuit. At the same time, the closed contacts 20-2 result in energizing the phase reversal light 118 to indicate that there has been a failure or a fault in the power source.

When this has been corrected, the phase relay 20 is again enabled, the control signal is again applied to the contactor coil 32 and timer 112 and the charging cycle is automatically resumed at the point at which it was interrupted.

As indicated above, when the charging current decreases to a preselected value, a timer in the drive circuit 82 is energized to terminate charging operations after a preselected interval, for example, three hours. At the end of this period, a shut down trigger relay is energized closing the contacts 116-1 in series with the shut down relay 108. The shut down relay 108 when energized closes contacts 108-3 so that the shut down relay remains energized even after the trigger relay is deenergized since the trigger relay receives its power from the secondary of the three phase transformer. Ths shut down relay 108 opens the normally closed contacts 108-2 in series with the contactor 32 and the timer 112 to deenergize the contactor coil and open the main contactors in the input lines 10, 12, 14 thereby deenergizing the charger. The shut down relay remains energized until the source is disconnected from the charger at which time the system is reset.

The override timer 112 not only serves as a manual switching mechanism to turn on the system but also acts to ultimately deenergize the system in the event that the timer in drive circuit 82 malfunctions. If the system is terminated by the override timer 112, timing out, the normally closed contacts 108-2 of the shut down relay 108 in series with the normally closed contacts 112-1 of the shut down timer 112 complete a circuit through the incomplete indicator 110 to turn that indicator on.

Thus, there has been described a control circuit for a three phase battery charging system which is simple to operate, fail safe and does not require trained personnel in order to insure that this system is properly connected. The system senses the connections of the input lines to a source, and does not operate unless the source is properly connected to the input lines. At the same time, the system is also precluded from operating unless batteries to be charged are properly connected to the output charging terminals.

The control circuit only allows the charging system to operate when all connections re properly made and when the system and batteries are properly grounded and interrupts the charging cycle in the event of a failure at the source or open in the connection to the batteries themselves. This system includes both solid state and safety timers to insure proper termination of the charging cycle and precludes further operation of the charger until after the source has been disconnected or the batteries have been removed from the charging output terminal.

From the foregoing, it will be observed that numerous variations and modifications may be effected wiithout departing from the true spirit and scope of the novel concept of the invention. It is, of course, intended to cover by the appended claims all such modifications as fall within the scope of the claims.

I claim:

1. In a system for charging storage batteries from a three phase power source, said charging system including three input lines, one for each phase of said source, charging output terminals for connection to storage batteries to be charged, and a charging circuit coupled to said input lines and energizeable by said source for applying a charging signal across said charging output terminals; a control circuit for said battery charging system comprising:

a plurality of contactor means disposed in said input lines and operable to connect said source to said chargng circuit and thereby effect energization thereof; and circuit means for controlling the operation of said contactor means incuding:

contactor control means energizeable to operate said contactor means;

phase sensitive relay means connected to said input lines and enabled in response to the presence of a source voltage on each of said input lines of selected magnitude and phase sequence;

means connected to said input lines for producing a control signal and for applying said control signal to said phase sensitive relay; and control switch means operable in response to enablement of said phase sensitive relay means and responsive to said applied control signal for connecting said control signal to said contactor control means to effect energization thereof;

whereby said contactor means are operated to energize a charging circuit.

2. In a system as claimed in claim 1 wherein said control system includes:

load sensing means connected to said charging output terminals and energized in response to the connection of batteries to be charged to said terminals; and load sensing switch means forming a part of said control circuit operated in response to energization of said load sensing means for enabling connection of said control signal to said contactor control means;

whereby said contactor control means is energized only when batteries are connected to said charging output terminals.

3. In a system as claimed in claim 2;

said load sensing means being responsive to the absence of batteries to be charged connected to said charging output terminals for disconnecting said control signal from said contactor control means, whereby said contactor control means is not energized.

4. In a system as claimed in claim 3:

said load sensing means being polarity sensitive and being energized only in response to the connection of batteries to be charged to said output terminals in a selected proper polarity.

5. In a system as claimed in claim 1:

wherein said control system includes:

timer means operated by said control signal; and timer contact means disposed in said control circuit, said timer contact means opening in response to said timer means timing out after said control signal has been applied thereto for a selected time period for deenergizing said contactor control means at the end of said time period and terminating said charging signal.

6. In a system as claimed in claim 5 wherein:

said timer means is manually settable to close said timer contact means and is responsive to the application of said control signal thereto for timing said charging time interval.

7. In a system as claimed in claim 6 wherein: said timer contact means are located in said circuit with said contactor control means, for precluding energization of said contactor control means when said timer contact means is open.

8. In a system as claimed in claim 1 including:

a fault indicator; and wherein said control switch means includes a pair of normally closed contacts and a pair of normally open contacts, said normally closed contacts applying said control signal to said fault indicator when said phase sensitive relay is not enabled and opening in response to enablement of said phase sensitive relay means, said normally open contacts closing in response to enablement of said phase sensitive relay means and in response to application of said control signal to said phase sensitive relay means for completing a circuit to said contactor control means to effect energization thereof.

* * * * *